United States Patent [19]
Yamatsu et al.

[11] Patent Number: 6,016,302
[45] Date of Patent: Jan. 18, 2000

[54] OPTICAL DISC AND METHOD FOR PRODUCING SAME

[75] Inventors: Hisayuki Yamatsu; Toshiyuki Kashiwagi, both of Tokyo; Shingo Imanishi, Kanagawa; Shin Masuhara, Tokyo, all of Japan

[73] Assignee: Sony Corporation, Tokyo, Japan

[21] Appl. No.: 09/066,867

[22] Filed: Apr. 28, 1998

[30] Foreign Application Priority Data

Apr. 30, 1997 [JP] Japan ..................................... 9-113134

[51] Int. Cl.$^7$ ....................................................... G11B 7/24
[52] U.S. Cl. ...................... 369/275.4; 369/84; 369/275.3
[58] Field of Search ............................ 369/275.4, 275.3, 369/121, 84, 58, 54; 430/320, 330, 321, 328, 945

[56] References Cited

U.S. PATENT DOCUMENTS

| | | | |
|---|---|---|---|
| 5,144,552 | 9/1992 | Abe ....................................... | 369/275.4 |
| 5,480,763 | 1/1996 | Kondo et al. ........................... | 430/320 |
| 5,581,531 | 12/1996 | Ito et al. ................................. | 369/100 |
| 5,717,676 | 2/1998 | Kaneda et al. .......................... | 369/116 |
| 5,777,981 | 7/1998 | Sugaya et al. .......................... | 369/275.4 |
| 5,822,287 | 10/1998 | Kubota et al. .......................... | 369/275.3 |
| 5,838,657 | 11/1998 | Tsuchiya et al. ....................... | 369/275.4 |

*Primary Examiner*—Tan Dinh
*Assistant Examiner*—Kim-Kwok Chu
*Attorney, Agent, or Firm*—Hill & Simpson

[57] ABSTRACT

An optical disc having pits shorter in length than 0.40 μm, with the ratio of the width of the shortest pit to that of the longest pit being not less than 0.8, is formed by forming a master disc by light exposure using a light source having a wavelength not shorter than 350 nm. By taking advantage of the fact that the pit width A looking from the reflective film 20 of the optical disc is deceased to be smaller on forming the reflective film 20 than the pit width B looking from the disc substrate 10 by a value equal to the film thickness, a row of pits, generally broader than the pit width optimum when looking from the side oft the disc substrate 10, is formed on light exposure on the master disc using the laser light having a wavelength not smaller than 350 nm. The reflective film 20 is formed on the row of pits transcribed from the master disc to the disc substrate 10 to provide a pit width which minimizes the inter-pit interference or jitter of the playback RF signals. The signals are read out from the side of the reflective film 20, that is from the side of the light-transmitting layer 30, instead of from the light-transmitting layer 30.

7 Claims, 8 Drawing Sheets

OPTICAL DISC AND METHOD FOR PRODUCING SAME

BACKGROUND OF THE INVENTION

1. Field of the Invention

This invention relates to an optical disc produced using a master disc having signals recorded thereon on light exposure, and a manufacturing method thereof.

2. Related Art

An optical disc, as a recording medium for recording signals to high density, is fabricated by stamping of the crests and recesses of a master disc corresponding to signals by, for example, injection molding. For raising the recording density of the so-produced optical disc, it is necessary to shorten the wavelength of the recording light used for forming the crests and recesses corresponding to the recording signals by light exposure on the master disc.

For forming pits by light exposure on a master disc of a digital video disc (DVD) having a recording density not less than five times that of a compact disc (CD), the Ar or Kr laser having a wavelength of 351 nm is used. In an optical system for converging the laser for light exposure, an objective lens having a numerical aperture (NA) of the order of 0.90 is used.

Although the optical system of the light exposure device, constructed with the laser and the objective lens, operates satisfactorily for forming the DVD master disc by light exposure, the laser of a shorter wavelength and an objective lens of a higher value of NA are required for forming the master disc of the optical disc having a recording density higher than the DVD by light exposure.

However, the laser of a shorter wavelength than 351 nm has as yet not reached the practically usable stage. On the other hand, the value of NA of the objective lens currently used is also approaching the limit value that can be obtained in air, such that it is difficult to obtain the objective lens having the NA not less than 0.90.

In addition, for light exposure of the master disc for the optical disc using the laser of a shorter wavelength than 351 nm, it is necessary to use a photoresist that is less stable than the currently used photoresist i.e, it requires stricter temperature and humidity control. Thus, it is feared that a master disc fabricating process which is in need of strict temperature and humidity control significantly different from that used heretofore needs to be introduced to render it extremely difficult to maintain operational stability.

The currently used master disc fabricating process experiences a problem that the width of a pit formed on light exposure depends on the pit length, such that the shorter the pit length, the narrower becomes the pit width. In a DVD maser disc produced on light exposure using an optical system having the laser for light exposure with wavelength of 351 nm and an objective lens having the numerical aperture of 0.90, the pit width is decreased to a negligible extent, even with the shortest pit 0.4 μm in length, because the shortest pit length is not excessively short as compared to the spot diameter of the laser for light exposure converged on the master disc.

However, if desired to produce a master disc for the optical disc higher in recording density than the DVD, the width of the pit having a length as short as 0.4 μm or less is significantly narrower than a pre-set pit width, such that the pit width reduction is no longer negligible.

If the pit formed on an optical disc is too narrow in width, sufficient amplitude (modulation degree) of RF signals reproduced from the shortest pit cannot be obtained. In addition, the center of the amplitude is shifted significantly from the threshold level for the bi-level signal, thus increasing jitter to lower the signal quality. That is, the larger the jitter, the error rate in counting the data (mark) length from the RF signal with clocks is increased.

However, it is difficult to produce a master disc for an optical disc of high recording density exceeding the recording density of the DVD using a conventional light exposure device used for forming the master disc for the optical disc.

SUMMARY OF THE INVENTION

It is an object of the present invention to provide an optical disc having a recording density higher than that of a conventional optical disc and a method for manufacturing an optical disc by fabricating a master disc having pits formed thereon to a higher recording density without introducing an optical disc having a higher recording density than a conventional optical disc or a process significantly different from the conventional process.

According to the present invention, there is provided an optical disc having a recording density higher than in the case of a conventional optical disc as well as a manufacturing method for an optical disc capable of producing an optical disc by light exposure of a master disc having pits formed thereon to a higher density without employing a process significantly different from the conventional method.

It is seen that, according to the present invention, there is provided a manufacturing method for an optical disc by exposing a master disc to light using a light exposure device having the laser of a wavelength of 351 nm and an objective lens having the numerical aperture of 0.90, in which fluctuations in the pit width dependent on the length of the pit formed on light exposure can be reduced so that the pit having a length not larger than 85% of the light spot for light exposure can have a width sufficient for a pre-set width. This gives an optical disc having a high recording density with reduced jitter in the playback RF signals.

BRIEF DESCRIPTION OF THE DRAWINGS

FIGS. 2a to 2d, continuing to FIGS. 1a to 1c, are schematic views for illustrating a method for producing an optical disc.

DESCRIPTION OF PREFERRED EMBODIMENTS

Referring to the drawings, preferred embodiments an optical disc and its manufacturing method according to the present invention will be explained in detail.

FIGS. 1A–1C and 2A–2C illustrate a conventional method for producing an optical disc.

Figure 1A:
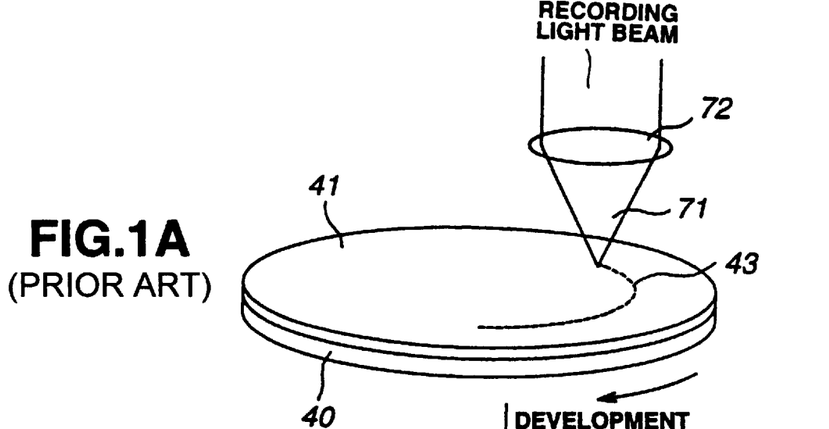
FIGS. 1a to 1c are schematic views for illustrating a method for producing an optical disc.

Referring first to FIG. 1a, a photoresist layer 41, coated on a circular glass master disc 40, having its surface sufficiently polished to a planar surface and rinsed, is exposed to light by a recording light beam 71 converged by an objective lens 72, in accordance with recording signals, for forming a latent image 43 of the row of pits. This light exposure step is termed laser cutting because the laser is used as the recording light beam 71.

The light converging position of the recording light beam 71, intermittently illuminated depending on the recording signals, is radially fed, as the glass master disc 40 is rotated, an equal distance per revolution of the glass master disc 40, for spirally forming a row of pits at a constant interval (track pitch) on the photoresist layer 41. The rows of pits can be made to meander or wobble by periodically shifting the illuminated position of the recording light beam 71 in the radial direction.

The photoresist layer 41 used here is a photosensitive material, such as a novolac resin, that can be rendered alkali-soluble by light exposure and is formed to a thickness of approximately 0.1 μm by a rotary coating method using a spinner.

Figure 1B:
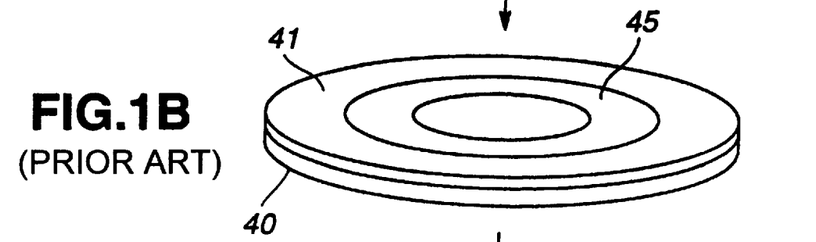

The glass master disc, thus exposed to light, is developed with an alkaline developing solution, as shown in FIG. 1b, to give a mastering master disc having a signal recording area 45, referred to herein simply as a master disc. In this signal recording area 45 of the photoresist layer 41, the portion exposed to light and thereby rendered alkali-soluble is dissolved and removed to form rows of pit corresponding to recording signals. The shape of the pits formed on light exposure on the signal recording area 45 will be explained subsequently.

Figure 1C:
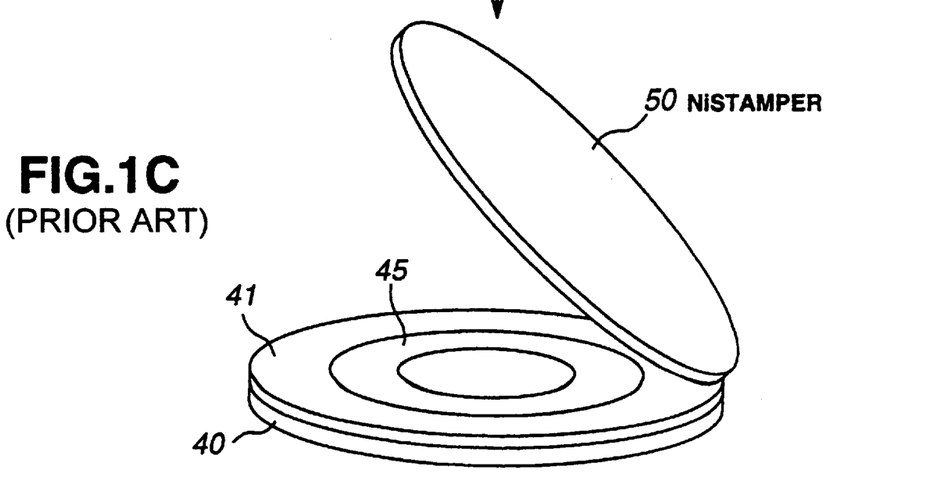

Then, as shown in FIG. 1c, the glass master disc 40, developed and having pits formed on its photoresist layer 41, is plated with Ni (nickel) to give a Ni stamper 50 having the rows of pits of the signal recording area 45 of the photoresist layer 41 formed on transcription thereon.

Figure 2A:
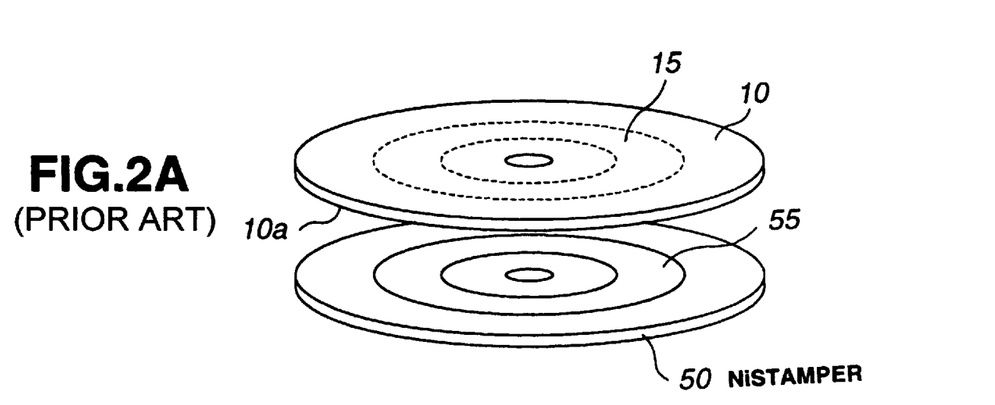

Then, as shown in FIG. 2a, the pit shape of the Ni stamper 50 is transcribed by an injection method or a photopolymerization (2P) method on the substrate material of the optical disc to form a replica substrate, that is a disc substrate 10. This transcribes the pit shape of a signal recording area 55 of the Ni stamper 50 on the signal recording area 15 of a surface 10a of the disc substrate 10.

Figure 2B:
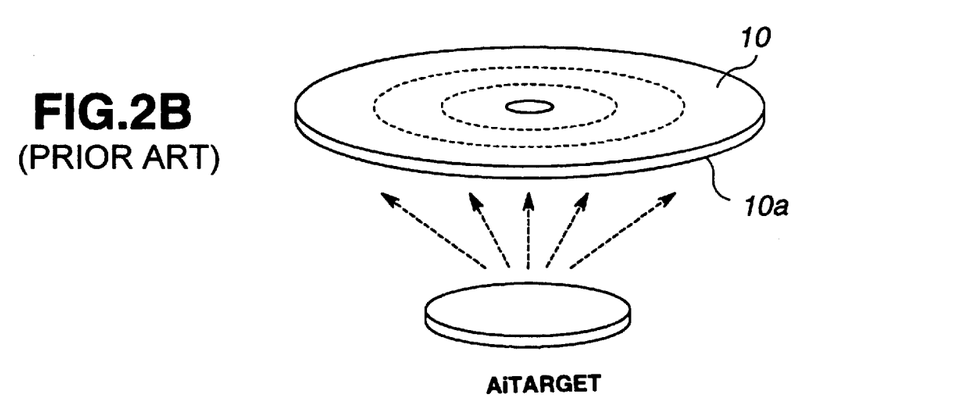

A reflective film is then formed on the surface 10a of the disc substrate 10, on which has now been transcribed the row of pits from the disc substrate 10, as shown in Fig.2b. As this reflective film, an Al (aluminum) film, formed by techniques such as ion beam sputtering employing an Al target, is used. A signal recording films, such as photomagnetic recording films or a phase change recording film, may be layered on the above-mentioned reflective film.

Figure 2C:
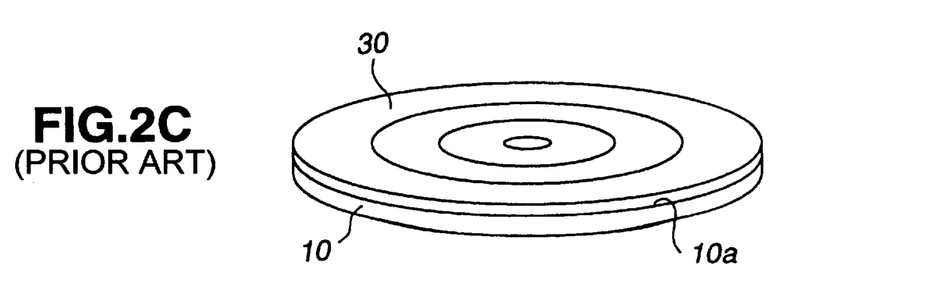

Finally, as shown in FIG. 2c, a light-transmitting layer 30 is formed on the reflective film 20 and the signal recording film, formed on the surface 10a of the disc substrate 10. This light-transmitting layer 30 is formed by, for example, spin-coating a UV curable resin (UV resin).

Figure 3A:
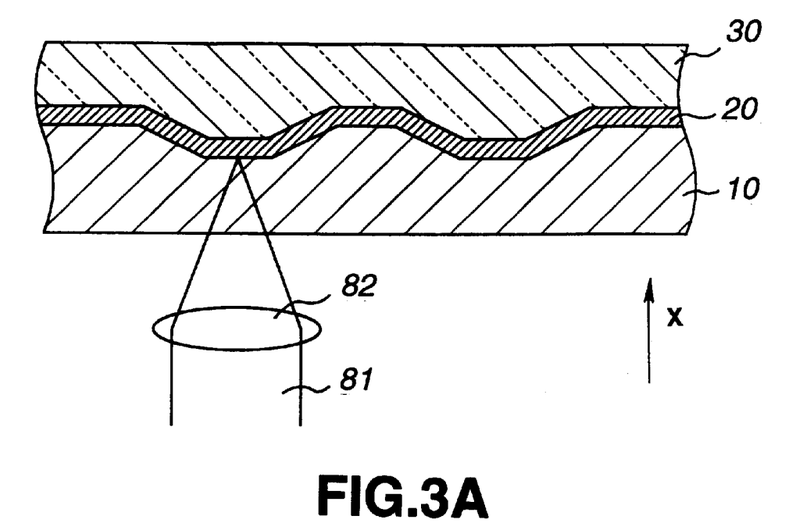
FIG. 3 is a schematic cross-sectional view of the optical disc.
Figure 3B:
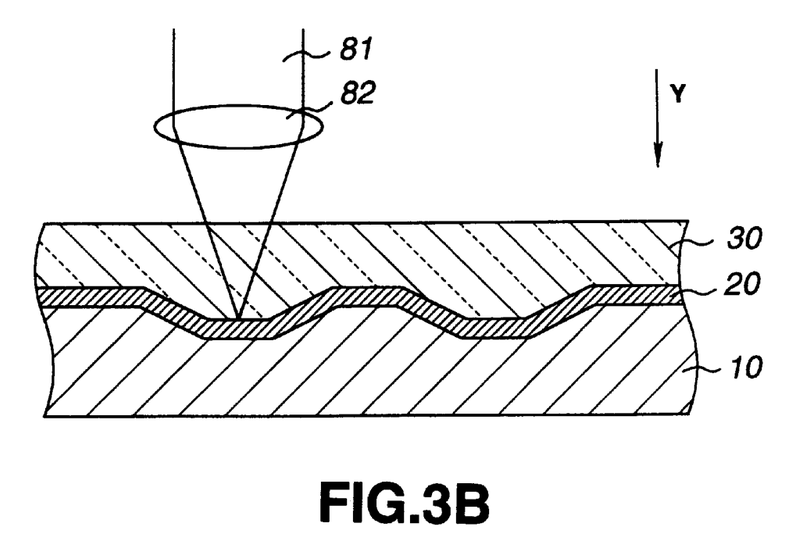

FIGS. 3a and 3b schematically show the structure of the cross-section of the optical disc fabricated by the above-described manufacturing method. In FIG. 3, the disc substrate 10 is the above-described replica substrate on which pits have been formed by transcription of the crests and valleys from the Ni stamper 50. On this disc substrate 10 is formed the reflective film 20, which is desirably an Al film with high reflectivity, as described above. There are occasions wherein a signal recording layer is formed as a sole layer or as a multiple layer, on the reflective film 20. On the reflective film 20 and the signal recording layer are further formed the light-transmitting layer 30.

With a compact disc having signals formed only on its one surface (CD), a read-out light beam 81, collected by an objective lens 82, is illuminated in the direction indicated by arrow A from the disc substrate 10 having a thickness of 1.2 mm, as shown in FIG. 3, for optically detecting the possible presence of pits recorded on the signal recording film 20 and the reflective film to read out the signal. On the surface of the light-transmitting layer 30, formed as a protective layer, is printed a label or the like. In the DVD, having signals recorded on its both sides, two optical discs, each shown in FIG. 3a, are stacked with the reflective layer sides in contact with each other. For each side, signals are read out from the disc substrate 10. In the DVD, each disc substrate 10 has a thickness of 0.6 mm.

Meanwhile, with the above-described optical disc, signals can also be read out from the light-transmitting layer 30 in the direction indicated by arrow Y in FIG. 3b. Of course, the light-transmitting layer 30 needs to be formed of a material satisfying the required optical characteristics and to have a label or the like stuck on its surface.

However, if it is attempted to read out signals recorded on the optical disc from the side of the light-transmitting layer 30 on the premise that signals intrinsically are read out from the side of the disc substrate 10, playback RF signals satisfying pre-set characteristics cannot be obtained because the shape of the pits formed on the optical disc as seen from the other side of the light-transmitting layer 30 differs from that as seen from the other side of the disc substrate 10. More specifically, in an optical disc fabricated on the premises that signals are read out from the side of the disc substrate 10, the rows of pits are of an optimized shape when seen from the side of the disc substrate 10.

Figure 4A:
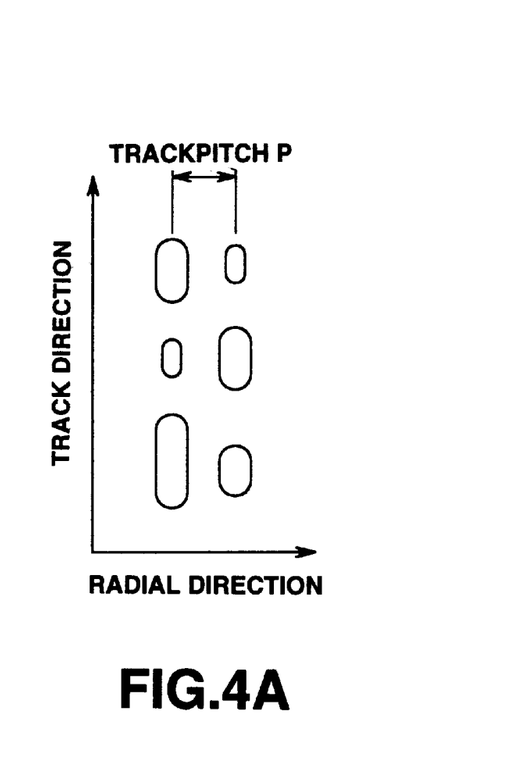
FIGS. 4a and 4b illustrate the difference in shape of the pit looking from the side of a substrate 10 and a light-transmitting layer 30.
Figure 4B:
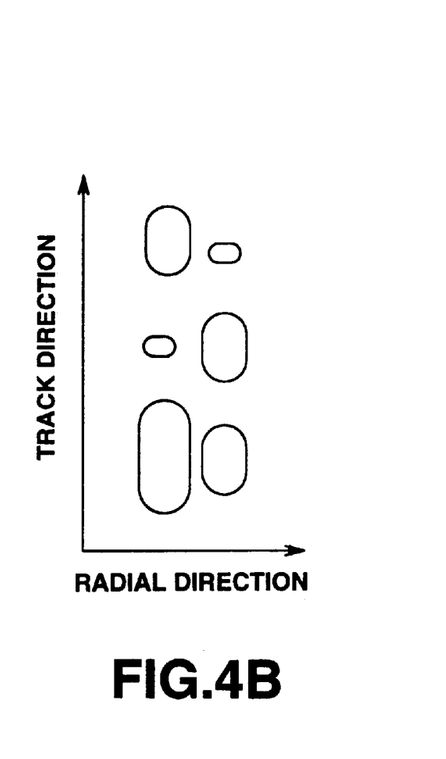

In FIG. 4, the row of pits of the optical disc, designed to read out signals intrinsically from the side of the disc substrate 10, is seen from the side of the disc substrate 10 and from the side of the light-transmitting layer 30.

FIG. 4a shows the pit rows as seen in the direction indicated by arrow X from the side of the disc substrate 10 of FIG. 3a. Thus it may be seen that there is formed a row of pits having an optimum pit width for obtaining playback RF signals.

However, if the same row of pits is seen from the side of the 130 of FIG. 3b in the direction indicated by arrow Y, the pit width is narrower than the optimum width as a result of deposition of the reflective film 20 and the signal recording player, thus increasing jitter of the playback RF signals. Thus, with the optical disc fabricated for reading out signals from the side of the light-transmitting layer 30, the pit width needs to be set so as to be broader than that of the optical disc fabricated for reading out the signals from the side of the optical disc.

At this time, the difference in pit width due to the length of the pit formed on light exposure on the master disc becomes smaller the larger the intensity of the laser light at the time of light exposure. This indicates that, if the pit is formed by light exposure to a broader width with the laser light higher in intensity than the usual laser light, and the pit width can be rendered uniformly narrower, inter-pit interference or jitter of the playback RF signals can be rendered smaller than that in the conventional optical disc.

The present invention provides an optical disc of a higher recording density than is possible with the conventional disc and the method for fabricating the disc. The optical disc of the present invention and the method for producing the disc are hereinafter explained.

Since the conventional method for an optical disc, comprised of the above-described process steps, is basically the same as the method for producing the optical disc according to the present invention, the following description is made only of the points different from the conventional method.

Figure 5A:
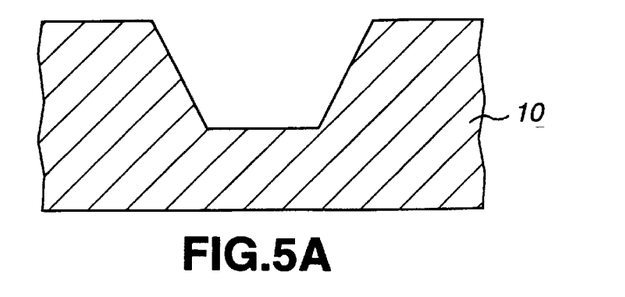
FIGS. 5a, 5b and 5c illustrate in detail the cross-sectional shape of a pit obtained on forming a reflective film on a row of pits on an optical disc substrate.
Figure 5B:
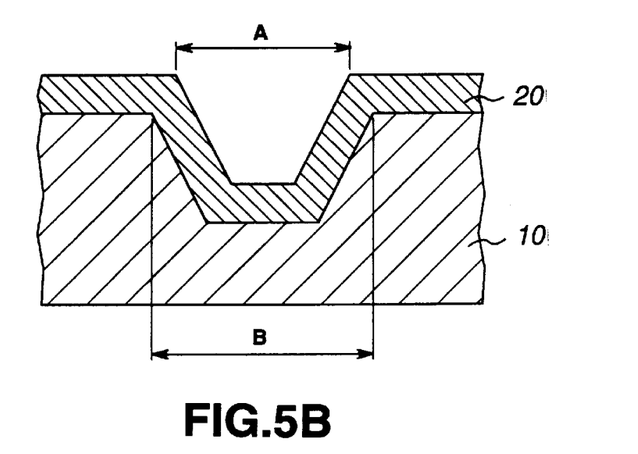

FIG. 5 shows the cross-sectional shape of the pit of the optical disc obtained with the manufacturing method for the optical disc according to the present invention. FIG. 5a shows the cross-sectional shape of the replica substrate (disc substrate 10) on which is transcribed of the Ni stamper, while FIG. 5b shows the shape of the pit after forming the reflective film 20 on the row of pits of the disc substrate 10. In the following description, it is assumed that no signal recording film is formed on the reflective film 20. If the signal recording film is formed, the above-mentioned reflective film 20 corresponds to the reflective film and the signal recording film.

As may be seen from these figures, the pit width B as seen from the side of the disc substrate 10 of the optical disc is not changed before and after the formation of the reflective film 20. However, the pit width B as seen from the side of the reflective film 20 becomes smaller on deposition of the reflective film 20 by a value corresponding to the thickness of the reflective film 20 than the pit width B.

This is positively exploited with the optical disc of the present invention. That is, the row of pits generally broader than the optimum pit width as seen from the side of the disc substrate 10 is formed by light exposure on the master disc, so that the pit width as seen from the side of the reflective film 20 will be optimum. The optical disc of the present invention also differs from the conventional optical disc in the read out of signals from the side of the disc substrate 10, that is from the side of the light-transmitting layer 30.

Figure 5C:
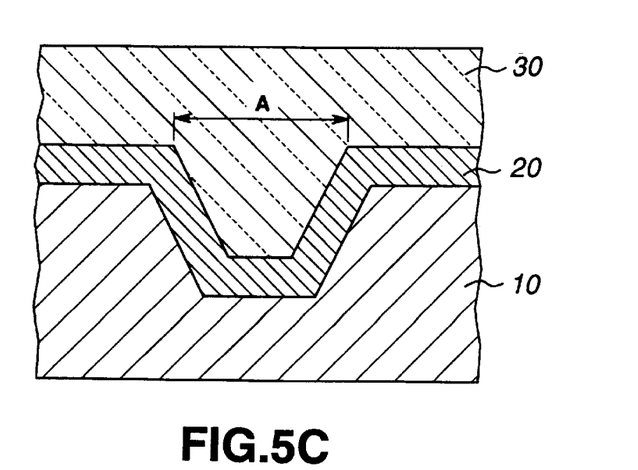

FIG. 5c shows the cross-sectional shape of the pit of the so-formed optical disc. The pit width A as seen from the side of the light-transmitting layer 30 is selected to be an optimum value which minimizes inter-pit interference and the jitter of the playback RF signals when reading out signals from the side of the light-transmitting layer 30.

Next, the optimum pit shape which minimizes inter-pit interference and the jitter of the playback RF signals when reading out signals from the side of the light-transmitting layer 30 is explained.

Figure 6A:
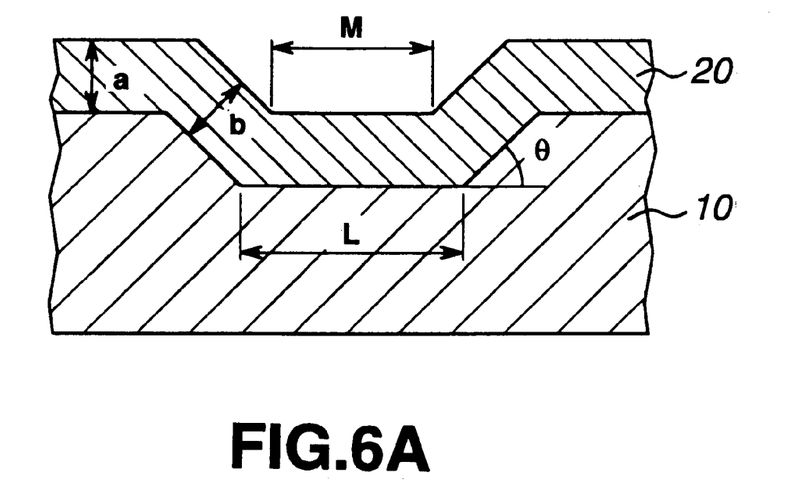
FIGS. 6a and 6b are views similar to FIGS. 5a, 5b and 5c for illustrating in detail the cross-sectional shape of a a pit obtained on forming a reflective film on a row of pits on an optical disc substrate.

FIG. 6 shows the cross-sectional shape of the pit after further forming the reflective film 20 on the row of pits formed on the disc substrate 10 of the optical disc. This reflective film 20 is formed by, for example, ion beam sputtering, as described above.

In this case, it is assumed that the width of the pit bottom is L, an average angle the pit wall surface makes with the disc surface is $\theta$ and the thickness of the reflective film 20 formed on the surface of the disc substrate parallel to its surface devoid of the row of pits is a. The value of L is e.g., not larger than 0.3 $\mu$m, with $\theta$ being of the order of 40 to 80°.

These values are determined depending on characteristics of the photoresist and the optical system employed for exposing the master disc to light.

The manner in which the pit formed on the disc substrate 10 is reduced as a result of deposition of the reflective film 20 is further explained.

If the reflective film 20 is formed by a film-forming method exhibiting full directionality of growing only in a direction perpendicular to the optical disc surface, the thickness b of the reflective film deposited on the pit wall surface of the disc substrate 10 is the minimum value of a×cos $\theta$. On the other hand, if the reflective film 20 is formed by a non-directional film forming method of growing equally in any direction, the thickness b of the reflective film 20 is equal to the maximum value equal to a. that is, the thickness b of the reflective film 20 deposited on the pit wall surface is in a range represented by the following equation (1):

$$a\cos\theta < b < a \tag{1}$$

Moreover, the reflective film 20 is required to satisfy the condition of having the minimum reflectivity required for reading out and reproducing signals from the optical disc. The film thickness for realizing this necessary minimum reflectivity is d, which is of the order of 20 nm in the case of an Al film. In addition, for obtaining signals form the pit, it is necessary to satisfy the condition that the reflective film 20 needs to be formed so that the pit will not be reduced to eliminate the bottom.

Figure 6B:
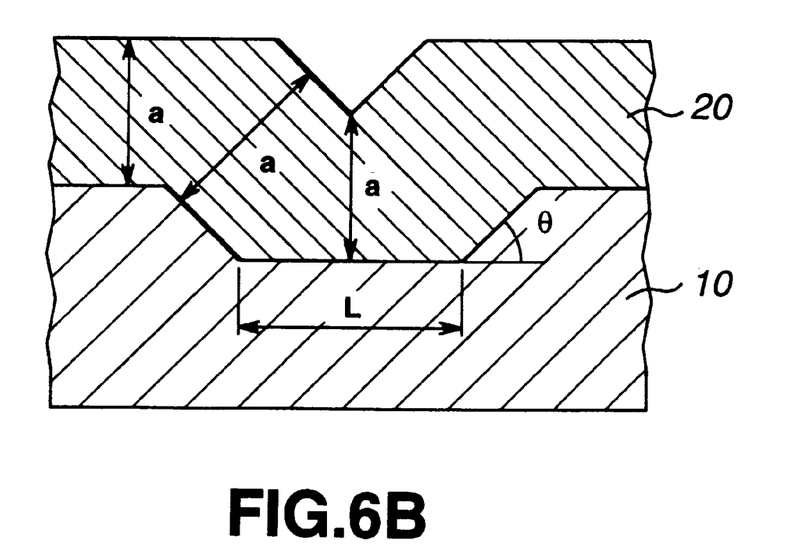

FIG. 6b shows the manner in which the pit formed on the disc substrate 10 by forming the reflective film 20 by the totally non-directional film-forming method is contracted uniformly. In this case, the reflective film 20 grows in the direction perpendicular to the pit wall surface a thickness a which is equal to the thickness by which the reflective film 20 grows on a plane parallel to the surface not having the row of pits of the disc substrate 10, so that the film thickness corresponding to the disappearance of the pit bottom surface as seen from the side of the light-transmitting layer 30 is represented by the following expression (2):

$$L \times \sin\theta / \{2 \times (1 - \cos\theta)\} \tag{2}$$

That is, if the film thickness a of the reflective film 20 is within the range specified by the expression (3):

$$d < a < L \times \sin\theta / \{2 \times (1 - \cos\theta)\} \tag{3}$$

the width M of the pit reduced by totally non-directional film forming is represented by the following expression:

$$M = 1 - 2 \times a \times \tan(\theta/2) \tag{4}$$

Therefore, the pit width M as seen from the side of the reflective film 20 is reduced in proportion to the film thickness a of the reflective film 20.

In the foregoing explanation, it is assumed that the film forming is totally non-directional. Conversely, if the film forming is fully directional, there occurs no bit width contraction due to the growth of the reflective film 20 as described above. However, in actual film forming, there occurs collapsed directionality due to bending of the flight path of the oncoming particles, so that, with growth of the reflective film 20, the pit width is necessarily contracted.

Next, the light exposure process for forming the pit row having a small difference between the long pit width and the short pit width and which is susceptible to inter-pit interference during read-out on the master disc to a lesser extent, in the optical disc manufacturing method according to the present invention, is explained.

The width of the pit formed on light exposure on the master disc becomes broader as the pit becomes longer and is saturated at a given pit length. Consequently, there is raised a problem that, when forming a pit that has a length shorter by about 85% than the spot diameter of the recording light used for exposing the master disc to light, the pit width is reduced significantly as compared to the pre-set pit width.

This is due to the fact that the amount of light exposure used for forming the short pit is smaller than that used for forming the long pit and is in the vicinity of the threshold value of the amount of light exposure required for sensitizing the photoresist. That is, in the vicinity of the threshold value, the pit formed on light exposure is abruptly changed in pit width, such that, the shorter the pit, the more sensitively the pit width is changed responsive to the increased or decreased light exposure intensity.

Figure 7:
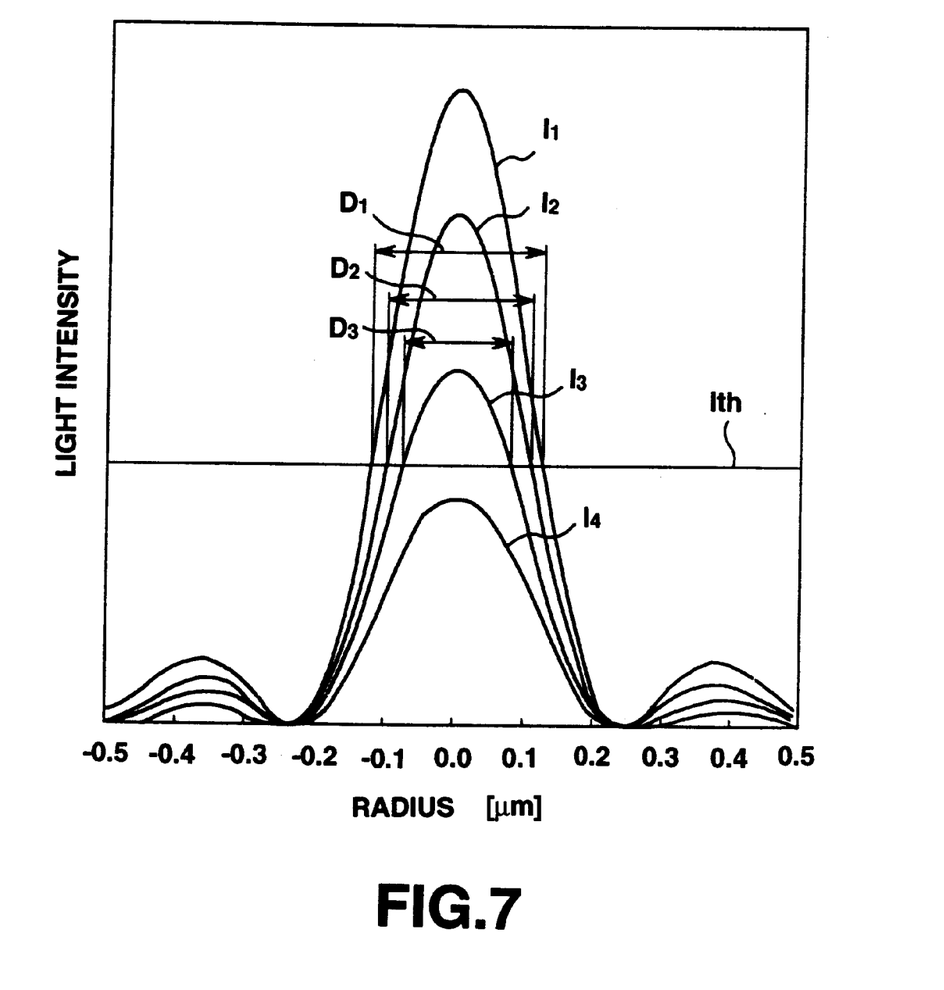
FIG. 7 is a graph showing light intensity distribution of the laser used as a light source for light exposure of a master disc.

FIG. 7 shows the light intensity distribution of the light beam used for exposing a master disc. In this figure, the ordinate and the abscissa denote the light intensity by an arbitrary unit and the beam radius, respectively.

If the peak intensity values of laser light beams for light exposure are given as $I_1>I_2>I_3>I_4$, the beam radii of the 0th order light which give the threshold value for light exposure $I_{th}$ which represents the necessary minimum light intensity for sensitizing the photoresist are progressively larger in the above order, such that $D_1>D_2>D_3$. With the peak intensity $I_4$, which is lower than the above-mentioned threshold value $I_{th}$, the photoresist is not exposed to light.

If these characteristics are utilized, the pit width of the pit formed on light exposure on the master disc becomes broader the larger the light intensity of the laser light for light exposure. If the peak intensity only slightly larger than the threshold value $I_{th}$, it is possible to form a pit shorter than the spot diameter of the light spot for light exposure.

For reducing the difference between the width of the long pit and the width of the short pit, a larger light exposure intensity is desirable. However, attention should be given so that the width of the longest pit will not be larger than the track pitch. For satisfying these conditions, optimum light exposure intensity is selected taking into account the light intensity distribution of the laser light for light exposure and photoresist characteristics.

Figure 8:
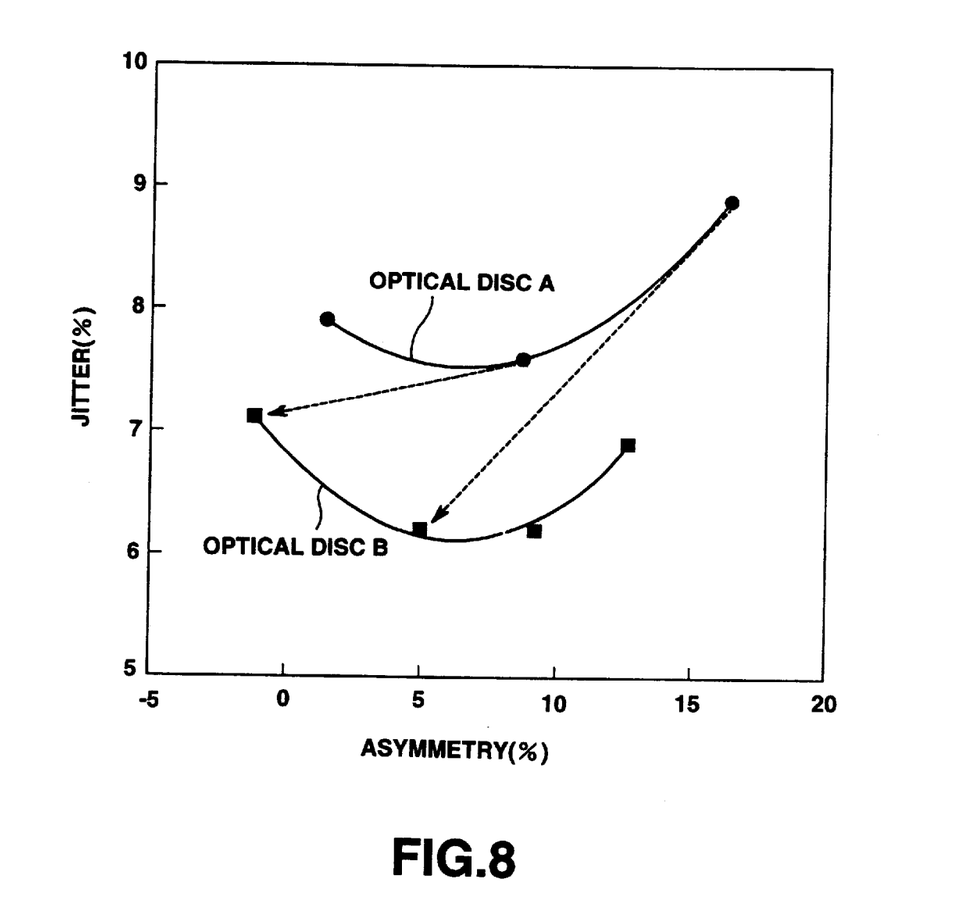
FIG. 8 is a graph showing the results of evaluation of a conventional optical disc configured for reading pits from the substrate side and the optical disc configured for reading pits from the side of the light transmitting layer according to the present invention.

FIG. 8 shows the results of evaluation of characteristics of playback RF signals using the same reproducing device with the read-out laser wavelength of 640 nm and the numerical aperture of the objective lens of 0.80 for an optical disc A adapted for reading out signals from the side of the disc substrate and an optical disc B adapted for reading out signals from the side of the light-transmitting layer. The optical discs A and B are manufactured using the same master disc on which signals have been recorded as the exposure light intensity is changed at an interval of a constant radius. The ordinate and the abscissa denote jitter of the playback RF signals as a percentage to the playback clocks in percentage and asymmetry of the playback RF signals.

It is noted that asymmetry is the relative values of the center of amplitude of the longest pit and that of the shortest pit normalized with the amplitude of the longest pit. Specifically, the positive asymmetry means that the center of amplitude of the shortest pit is closer to the ground side than the center of amplitude of the longest pit, while the reverse is the case with the negative asymmetry. In general, the larger the positive value of asymmetry, the broader tends to become the pt width. In the drawing, arrow marks specify data of the corresponding recording area of the above optical discs A and B.

The above results of evaluation are those for the case of recording random EFM (eight-to-fourteen modulation) signals with a track pitch P of 0.55 µm and the shortest pit length of 0.29 µm by using The light exposure device with the recording light beam whose wavelength is 351 nm and the objective lens whose numerical aperture of the objective lens is 0.90. On a substrate 12 cm in diameter, there are recorded signals equivalent to 8.65 GB.

Usually, in the optical disc A adapted for reading out signals from the disc substrate side, signals are recorded on light exposure as conventionally, whereas, in the optical disc B adapted for reading out signals from the light-transmitting A layer side, signals are recorded on light exposure in the same way as conventionally after inversion of "0" and "1" of the recorded signals, although this problem is not raised if the random signals used as described above. That is, it is necessary with the optical disc B that the recessed and crests transcribed on the disc substrate be formed in an inverted form. Also, when reading out signals from the optical disc B, the direction of disc rotation is inverted from that for the optical disc A. However, the direction of disc rotation during signal recording on the master disc may also be reversed.

The above-described light exposure device used is such device among those currently used in general for light exposure of the master disc of the optical disc that is capable of exposing the finest pit to light. The spot diameter of the recording light collected on the master disc is given by the expression (5):

$$1.22 \times \lambda / (\text{numerical aperture}) = 0.48 \, \mu m \tag{5}$$

with the shortest pit length being approximately 60% of the spot diameter.

It is seen from these results of evaluation that, for any of the optical discs A and B, asymmetry minimizing jitter of the playback RF signals is 5 to 10%. The reason jitter is increased for asymmetry smaller than this to lower characteristics is the excessively narrow width of the short pit.

If, with the optical disc A fabricated for reading out signals from the side of the disc substrate, the short pit is increased in width, that is asymmetry is increased, the pit width in its entirety is excessively broad to increase crosstalk or inter-symbol interference to worsen jitter in a similar manner.

However, with the optical disc B fabricated to read out signals from the side of the light-transmitting layer (the side of the reflective film), in which the pit width in narrow in its entirety, so that, if pits are read from the side of the disc substrate, asymmetry if of the order of 5% even with broad-width pits with asymmetry exceeding 15%, asymmetry is of the order of 5%, thus minimizing jitter. This is because the short pit is not excessively narrow in width, with tie entire pit width being not broad excessively.

It is seen from the above results of evaluation that, while the minimum value of jitter of the optical disc A fabricated to read out signals from the side of the disc substrate is of the order of 7.5%, it is possible to improve the minimum value of the jitter to as high as 6% with the optical disc B fabricated to detect pits from the light-transmitting layer to read out signals in accordance with the present invention.

What is claimed is:

1. An optical disc having a substrate comprising a row of pits corresponding to recording signals formed thereon, a reflective film formed on the surface of the substrate carrying the row of pits, and a light-transmitting layer formed on said reflective film, in which signals recorded as said row of pits are read out from the side of the light-transmitting layer, wherein the improvement resides in that the row of pits as referenced from the side of the light-transmitting layer includes pits whose pit length is shorter than 0.40 μm, with the ratio of the pit width of the shortest pit length to that of the longest pit length being not less than 0.8.

2. The optical disc as claimed in claim 1 further comprising:

a signal recording film between said reflective film and the light-transmitting layer.

3. The optical disc as claimed in claim 2 wherein said reflective film and the light-transmitting layer are each formed in two or more layers.

4. A method for producing an optical disc by transcribing to a substrate material a row of pits formed via light exposure in conjunction with recording signals on a master disc, comprising:

a light exposure step of forming a row of pits including pits having a pit length not larger than 85% of the exposure light spot diameter on a master disc of the light exposure in conjunction with the recording signals, the row of pits including pits each having a pit length not longer than 0.40 μm is formed on light exposure using the light having a wavelength not less than 350 nm;

a transcription step of transcribing the row of pits formed on said master disc on a disc substrate; and a film forming step of forming a reflective film on the surface of the disc substrate to which the row of pits has been transcribed.

5. The method for producing an optical disc as claimed in claim 4, wherein the width of the longest pit formed on light exposure on the master disc has a pit width smaller than the track pitch.

6. The method for producing an optical disc as claimed in claim 4, wherein the ratio of the pit width of the shortest pit to the pit width of the longest pit of the row of pits transcribed on the disc substrate is not less than 0.8.

7. The method for producing an optical disc as claimed in claim 4 wherein the reflective film has a film thickness not larger than a film thickness given by the expression:

$$L \times \sin \theta / \{2 \times (1 - \cos \theta)\}$$

where L is the width of the bottom surface of the pit transcribed on the substrate and θ is the average inclination which the pit wall surface makes with the disc surface.

* * * * *